Nov. 11, 1930.    C. DORNIER    1,781,446
ACCOMODATION OF LIQUIDS IN FLYING MACHINES
Filed June 16, 1928
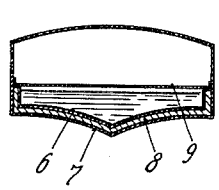
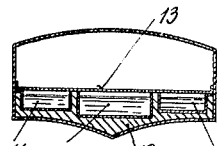
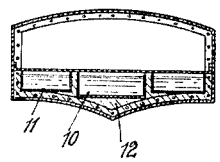
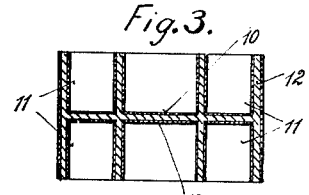
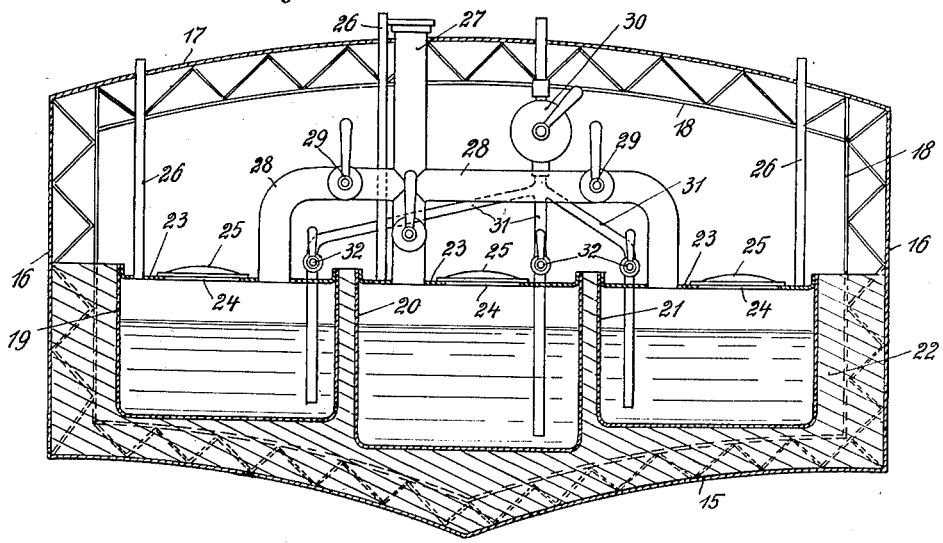
Inventor:
Claudius Dornier
by [signature]
Atty.

Patented Nov. 11, 1930

1,781,446

UNITED STATES PATENT OFFICE

CLAUDIUS DORNIER, OF FRIEDRICHSHAFEN-ON-THE-BODENSEE, GERMANY, ASSIGNOR TO THE FIRM: DORNIER-METALLBAUTEN G. M. B. H., OF FRIEDRICHSHAFEN-ON-THE-BODENSEE, GERMANY

ACCOMMODATION OF LIQUIDS IN FLYING MACHINES

Application filed June 16, 1928, Serial No. 285,976, and in Germany June 21, 1927.

My invention relates to air-craft and more especially to flying machines, such as hydroplanes, seaplanes, flying boats and the like provided with a floating fuselage or with floats enabling same to float on the water. The invention has particular reference to the accommodation of the petrol, lubricating oil and other liquid material required in the operation of the machine, and one of its objects is to provide means whereby such liquids can be accommodated and stored in the floating bodies forming part of such machines without any danger and with the greatest possible saving of space.

According to the present invention I store the liquid, fuel, lubricant or other liquid required in the operation of the craft above the bottom of the floating body or bodies forming part thereof. In the case of a flying boat I store such liquids in the boat's hollow and in the case of a hydroplane in the floats.

Hitherto the liquid fuel lubricant and the like was stored in separate containers arranged at some distance from the ground or from the surface of the water, and in consequence of the elevated position of these liquids the mass forces caused severe stresses of the flying machine structure and more especially of the boat's hull, floats or the like when starting or alighting on the water.

My invention avoids these drawbacks by storing these liquids near the bottom of the floating body forming part of the machine and uniformly distributing the weight of the liquids over a greater surface. I avoid the use of freely movable containers and, if the boat's hull, float or the like is subdivided into several compartments, the walls separating such compartments can be materially thinner than those of freely movable containers whereby considerable saving of weight is obtained.

In the drawing affixed to this specification and forming part thereof several modifications of a flying machine embodying my invention are illustrated diagrammatically by way of example.

In the drawing Figs. 1, 2 and 4 are cross-sections of three different kinds of floats or boats' hulls embodying my invention, Fig. 3 being a plan view showing the form illustrated in Fig. 2 in partial horizontal section.

Fig. 5 is a cross-section drawn to a larger scale of a forth modification.

In order to prevent leakage of the floating body of the craft, such as a float of a hydroplane or the hull of a flying boat and to provide for inequalities of the bottom and for rivet heads projecting above the bottom and so on, I prefer mounting above the bottom and spaced therefrom and from the side walls a separate container and I fill the interstices between such containers and the walls of the floating bodies with some elastic material, such as cork meal, cellular rubber or the like.

Fig. 1 illustrates a floating body in which a separate container 6 is secured above the bottom 7, with an elastic intermediate layer 8 inserted between them, which at the same time holds the container 6 in place. 9 is a cover closing the container.

In the modification illustrated in Figs. 2 and 4 care has been taken to space the container from the bottom of the floating body in such manner, that it can extend across the frames and other obstructions and the elastic intermediate layer is correspondingly higher. Here three series of containers, a middle series 10 and two lateral series 11 are arranged, above the intermediate layer 12 covering the bottom and part of the side walls of the float and extending also between the side walls of adjoining containers. 13 is a cover closing all the containers.

As shown in Fig. 4, the containers 10 and 11 are partly resting on the frames 14 of the float.

In the modification illustrated in Fig. 5, 15 is the bottom, 16 are the side walls and 17 is the cover of the hull of a flying boat, all of them being braced by girder-like structures 18. Three rows of fuel containers 19, 20 and 21 are provided in spaced relation to the bottom of the hull, the interstices between the containers and the bottom and side walls being filled with elastic material 22. Covers 23 are provided with manholes 24 closed by covers 25. Vent pipes 26 extend from the covers 23 upwards and through the top plates 17 of the hull. 27 is a central filling pipe through which fuel or other liquid can be filled into the containers or tanks, branch pipes 28 leading to the several tanks. Manually operable valves 29 provided in the branch pipes allow distributing the fuel entering through pipe 27 according to requirements. 30 is a pump, the suction pipe 31 of which is branched so that each tank can be connected with the pump by operating one of the valves 32, provided in the suction pipe branches. Obviously the tanks or containers are protected against damage by the elastic intermediate layer. They can be refilled and emptied at will either singly or all together.

I wish it to be understood that I do not desire to be limited to the exact details of construction shown and described for obvious modifications will occur to a person skilled in the art.

I claim:

1. Flying machine of the flying boat type comprising a boat-shaped fuselage or hull, a plurality of liquid tanks mounted in juxtaposition in the lower half of said hull above and spaced from the bottom thereof, elastic material filling the interstices between the side walls of said tanks and between the tanks and the side walls and bottom of said hull, a pump, a plurality of suction tubes extending from said pump into said tanks and a refilling tube, branch tubes extending from said refilling tube to said tanks.

2. Flying machine comprising a floatable body, elastic material covering the bottom and side walls and filling about the lower half of the inner space of said body, a fuel tank seated in and having its bottom and side walls surrounded by said material and means for feeding fuel into and withdrawing fuel from said tank.

In testimony whereof I affix my signature.

CLAUDIUS DORNIER.